United States Patent
Clark et al.

(10) Patent No.: US 9,113,750 B2
(45) Date of Patent: Aug. 25, 2015

(54) SYSTEM FOR PRODUCING BEVERAGES

(75) Inventors: Charles H. Clark, Springfield, IL (US); Suresh Radhakrishnan, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 2480 days.

(21) Appl. No.: 11/576,877

(22) PCT Filed: Oct. 8, 2005

(86) PCT No.: PCT/US2005/036386
§ 371 (c)(1),
(2), (4) Date: Oct. 22, 2007

(87) PCT Pub. No.: WO2006/042208
PCT Pub. Date: Apr. 20, 2006

(65) Prior Publication Data
US 2008/0092746 A1   Apr. 24, 2008

Related U.S. Application Data

(60) Provisional application No. 60/617,105, filed on Oct. 8, 2004.

(51) Int. Cl.
*A47J 31/00* (2006.01)
*F24H 1/00* (2006.01)
*A47J 31/54* (2006.01)
*F24H 1/20* (2006.01)

(52) U.S. Cl.
CPC ............... *A47J 31/54* (2013.01); *A47J 31/007* (2013.01); *F24H 1/00* (2013.01); *F24H 1/20* (2013.01)

(58) Field of Classification Search
USPC .............. 99/281, 297, 305, 307, 302 FB; 392/451, 458, 441, 442, 447, 449
See application file for complete search history.

(56) References Cited

U.S. PATENT DOCUMENTS

| | | | |
|---|---|---|---|
| 3,618,853 A | 11/1971 | Trimboli | |
| 3,905,518 A * | 9/1975 | Dreibelbis et al. | 222/146.5 |
| 4,084,547 A * | 4/1978 | Deziel | 122/504 |
| 4,263,498 A * | 4/1981 | Meyers | 392/451 |
| 4,424,767 A * | 1/1984 | Wicke et al. | 122/13.3 |
| 4,531,046 A | 7/1985 | Stover | |
| 4,602,145 A * | 7/1986 | Roberts | 392/496 |
| 4,906,817 A | 3/1990 | Kurz | |
| 4,917,005 A | 4/1990 | Knepler | |
| 5,251,541 A | 10/1993 | Anson et al. | |
| 5,901,634 A | 5/1999 | Vancamp et al. | |
| 6,094,524 A * | 7/2000 | Riley | 392/485 |
| 6,405,932 B1 | 6/2002 | Palmer | |
| 6,536,464 B1 | 3/2003 | Lum et al. | |
| 6,701,953 B2 * | 3/2004 | Agosta | 137/268 |
| 6,847,782 B1 * | 1/2005 | Kovacs | 392/451 |
| 7,163,126 B2 | 1/2007 | Knepler | |
| 7,798,053 B2 * | 9/2010 | Clark et al. | 99/281 |
| 2009/0120299 A1 | 5/2009 | Rahn et al. | |

* cited by examiner

Primary Examiner — John E Simms, Jr.
(74) Attorney, Agent, or Firm — Barnes & Thornburg LLP (57) ABSTRACT

The present disclosure relates to a system for producing beverages or other food products which includes, generally and broadly, controllably dispensing water from the system for use in brewing. Water is introduced to a heated water reservoir (20) heating and subsequent use in a process such as brewing. A thermal expansion system (86) is provided to accommodate water which expands from the reservoir (20) as a result of the heating process. One form of thermal expansion system (86) may include a venturi device (88) which allows the accumulation of water which expands during the heating process and then returns the water to the flow of water during a brew cycle.

30 Claims, 4 Drawing Sheets

SYSTEM FOR PRODUCING BEVERAGES

BACKGROUND

The present disclosure relates to a system for producing beverages which includes controllably dispensing water from the system for use in brewing. The water enters the system through a pressurized line which includes at least a controllable inlet valve.

A variety of brewing devices have been developed and employ a variety of methods and apparatus to introduce water to a heating system and to dispense water from the heating system. For example, one form of brewer includes a rapid heating chamber in which unheated water is introduced into the rapid heating chamber where upon it is rapidly heated and dispensed over ground coffee for producing a brewed beverage.

Another form of brewing system includes a reservoir for retaining a quantity of heated water which is maintained generally at a heated temperature or within a temperature range for use in brewing on demand. In one embodiment of this "on demand brewing system", water is introduced into a basin which is positioned above the heated water reservoir and communicates with the heated water reservoir. Water flows under force of gravity from the reservoir into the heated water reservoir. Generally, the water is introduced in the bottom of the reservoir where it might naturally settle due to the temperature differential. Generally, when water is introduced into the heated water reservoir it displaces a quantity of heated water which is then dispensed through an outlet, a dispensing or spray line onto ground coffee for producing a brewed coffee beverage. The flow of water into and out of the heated water reservoir is controlled by the volume and gravity or head pressure of the water in the basin.

Another embodiment of the brewing device incorporates the heated water reservoir as described above and a pressurized inlet line. The pressurized inlet line introduces water directly into the heated water reservoir whereupon it pressurizes or displaces water from the reservoir. An outlet line extending from the reservoir to a quantity of ground coffee is used to dispense water over the ground coffee. In order to control the dispensing of water over the ground coffee a controllable dispensing valve is provided on the outlet line. The control valve on the outlet line reduces or prevents dripping of water which might otherwise be caused as a result of the thermal expansion when heating the unheated water which was introduced into the reservoir during the brew cycle.

It may be desirable to provide a system which is attached to a pressurized line or "plumbed" into a pressurized water line. This is desirable in many settings so as to avoid having to manually dispense a quantity of water and pour it into a basin such as described above. It is useful to have a plumbed water connection in settings such as institutional settings, office coffee service settings and other environments such as cafeterias to allow an operator to load the machine with coffee, press a button and obtain fresh brewed coffee.

One of the issues associated with a pressurized system is that it requires the controllable outlet valve as described above. The controllable outlet valve, while performing well under most circumstances, requires additional work in order to address issues associated with lime buildup in the outlet line. In this regard, lime or other mineral deposits tend to accumulate or accrete on the inside of the heated water system. This action and accumulation tends to be accelerated in heated areas of the system and lines transporting hot water such as the outlet tube. While this material can be removed, it may tend to clog and otherwise interfere with the operation of the outlet valve. Additionally, the outlet line can only be easily cleaned from the spray head or outlet nozzle up to the controllable valve because the controllable valve will not accept a cleaning device such as a spring or other cleaning coil or brush. As such, in these prior art devices, it is more difficult and time consuming to remove lime or other mineral deposits in the heated water system.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

FIGS. 1 through 4 provide a variety of diagrammatic illustrations relating to the present disclosure. All these illustrations are intended for use with a heated water system and more particularly may be used with a heated water system which is used for producing a brewed beverage. It should be understood that the present disclosure is not limited to the system, but is intended to be broadly interpreted to include all applications such as described in detail herein and which might be developed based on the disclosure provided herein.

While the term "heated" may be used throughout this disclosure, the term is to be broadly interpreted to include all forms of water or dilution liquid of any temperature, generally in which the water has been heated. The term heated includes the term "hot" such that one might consider the water to be hot based on the numerical temperature. Generally, the temperature of the water is below or at the relevant boiling temperature (212 degrees F. at sea level) above which the water will generally transform to steam. The term heated is used to distinguish from the term unheated such that unheated water is generally introduced into the reservoir during the brewing cycle. In or near the reservoir the water is heated resulting in heated water.

Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but be limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials to obtain a desired beverage or food product. This broad interpretation is intended to include, without limitation, at least funnel and filter-type, packet or pouch-type, pod-type or other prepackaged or unpackaged forms of retaining and brewing a beverage or making of a food product. The terms heated water may be interpreted as hot water, and generally refers to adding energy to water to heat the water above ambient temperature.

Figure 1:
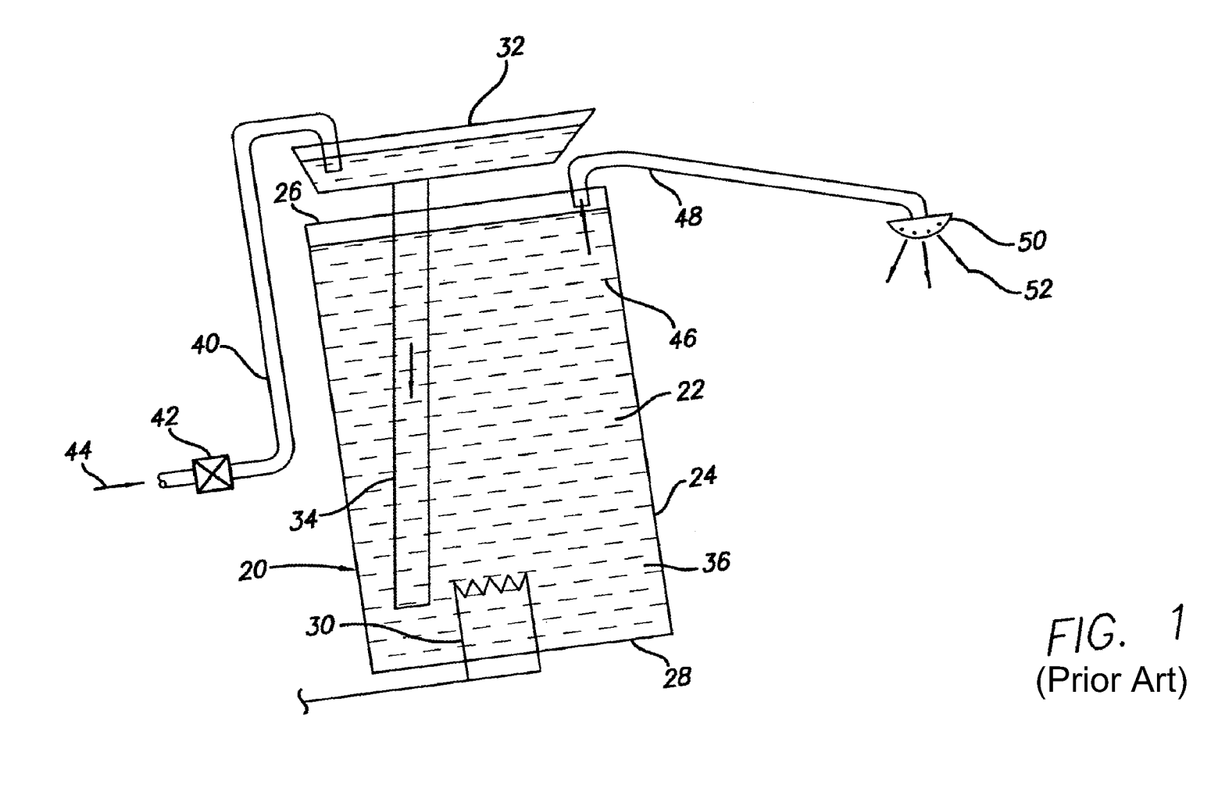
FIG. 1 is a diagrammatic side elevational view of a pour over brewing system.

As shown in FIG. 1, a heated water reservoir 20 defines a volume of water 22 which is retained therein. The reservoir 20 is defined by a wall 24 including a top 26 and a bottom 28. Other various forms of the reservoir may be developed and are completely considered to be included within the scope of this disclosure. In the embodiment as shown, a heating element 30 is provided to heat the water 22 retained in the reservoir 20.

In this embodiment, a fill basin 32 is provided in the location generally above the reservoir 20. A fill tube 34 communicates with the basin 32 and extends downwardly into and communicates with the internal volume of the reservoir 20. In this manner, water can be introduced into the basin 32 and flow under force of gravity through the fill tube into the reservoir 20. Water flows through the fill tube to a location in the lower portion 36 of the reservoir 20 so as to position the unheated water generally in close proximity to the heating element 30. It should be noted that the heating element 30 may take many different forms and configurations and the heating element 30 shown herein, is only provided by way of background. The heating element 30 may be in the reservoir, outside of the reservoir, or otherwise positioned to provide energy to the water in the reservoir. It is envisioned that any form of heating element providing heat or other energy, directly or indirectly, to the water 22 contained in the reservoir 20 is fully within the scope of the present disclosure.

As shown in FIG. 1, the basin 32 receives water from a pressurized inlet line 40. Flow of water into the line 40 is controlled by a controllable valve 42. As such, inlet water 44 flows through the inlet tube under control of the controllable valve 42. Water is allowed to flow into the fill basin 32 for a predetermined period of time. As water accumulates in the fill basin and drains through the fill tube 34, it flows into the lower portion 36 of the reservoir 20. The cooler water raises or displaces the hot water towards the upper portion of the reservoir 46 whereupon it will reach outlet line 48. Upon reaching the opening of the outlet line 48 positioned in the reservoir, water will flow into the outlet line and drain to the spray head 50 establishing a siphon action. The driving action to move water out of the tank is gravity and siphon action. Water 52 flows out of the spray head and into a coffee brewing device or other device for appropriate use as will be described in greater detail below. The water from the spray head 50 can flow into a brewing substance retaining device or, as illustrated, a funnel 54 positioned there below for mixing with coffee retained therein and producing a brewed beverage 56 for dispensing into a carafe 58. This additional disclosure is provided in greater detail with regard to the discussion of the embodiment of FIG. 3.

While the disclosure shows an illustration of a brewer as described above, it is intended and understood that the term brewer is to be broadly interpreted to include brewers of any configuration including that as shown as well as, by way of example but not limitation, single cup or pod brewers. Pod brewers are brewers which retain a pod or prepackaged beverage product and deliver to or force water through the pod to brew a beverage. Many pod brewers produce one or two cups of beverage instead of 4-12 cups as is produced by many other brewers. Pod brewers may be configured consistent with the teachings of this disclosure to be connected to a pressurized water line and provide line pressure brewing. The teachings of this disclosure are intended to be broadly interpreted and applied to a variety of brewer sizes, styles and configurations consistent with the principals disclosed herein.

Figure 2:
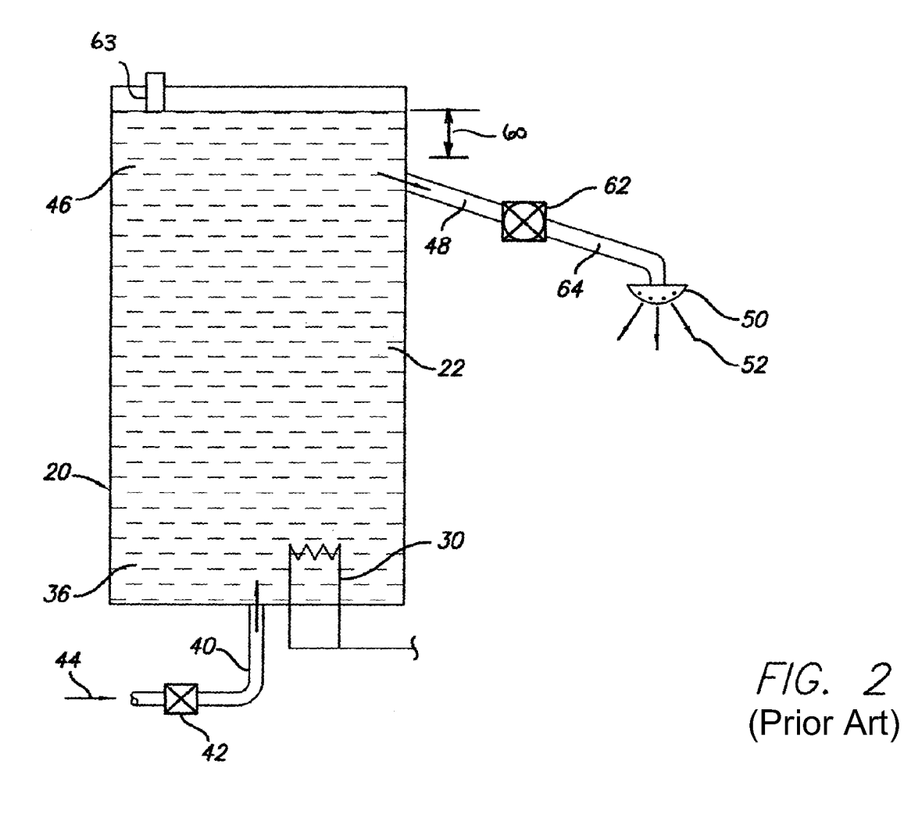
FIG. 2 is a diagrammatic side elevational view of a pressurized incoming water line and head pressure system as used for brewing.

In a similar system as shown in FIG. 2, water 44 is introduced into an inlet line 40 for introduction into the reservoir 20. The heating element 30 heats water introduced into the lower portion 36 of the reservoir 20. The inlet line 40 and flow of water into the reservoir 20 is controlled by the controllable valve 42. As water flows into the reservoir 20 head pressure 60 develops in the upper portion 46 of the reservoir 20. The head pressure 60 helps to maintain a constant flow of water out of the reservoir 20. The space 61 above the surface of the water in reservoir 20 is vented to the atmosphere by vent line 63. The driving action to move water out of the tank is gravity. Water flow is controlled by the controllable outlet solenoid 62 which is positioned along the outlet line 48 generally between the reservoir 20 and the spray head 50. In this system pressure is provided by the head pressure 60 and controllably operated by the controllable outlet solenoid valve 62.

As noted above, one of the problems with this type of system is that lime or other minerals tend to deposit in the outlet line 48. This may be exacerbated by the outlet line 48 being a heater water line, which tens to increase the rate of mineral accretion. Cleaning of the outlet line 48 is generally only practical in an easy efficient manner by removal of the spray head 50 and cleaning of the outlet line 48 for the length 64 between the spray head 50 and the controllable outlet solenoid 62. In this regard lime may tend to accumulate in the upper portion of the outlet line 48 between the outlet valve 62 and the reservoir 20.

Figure 3:
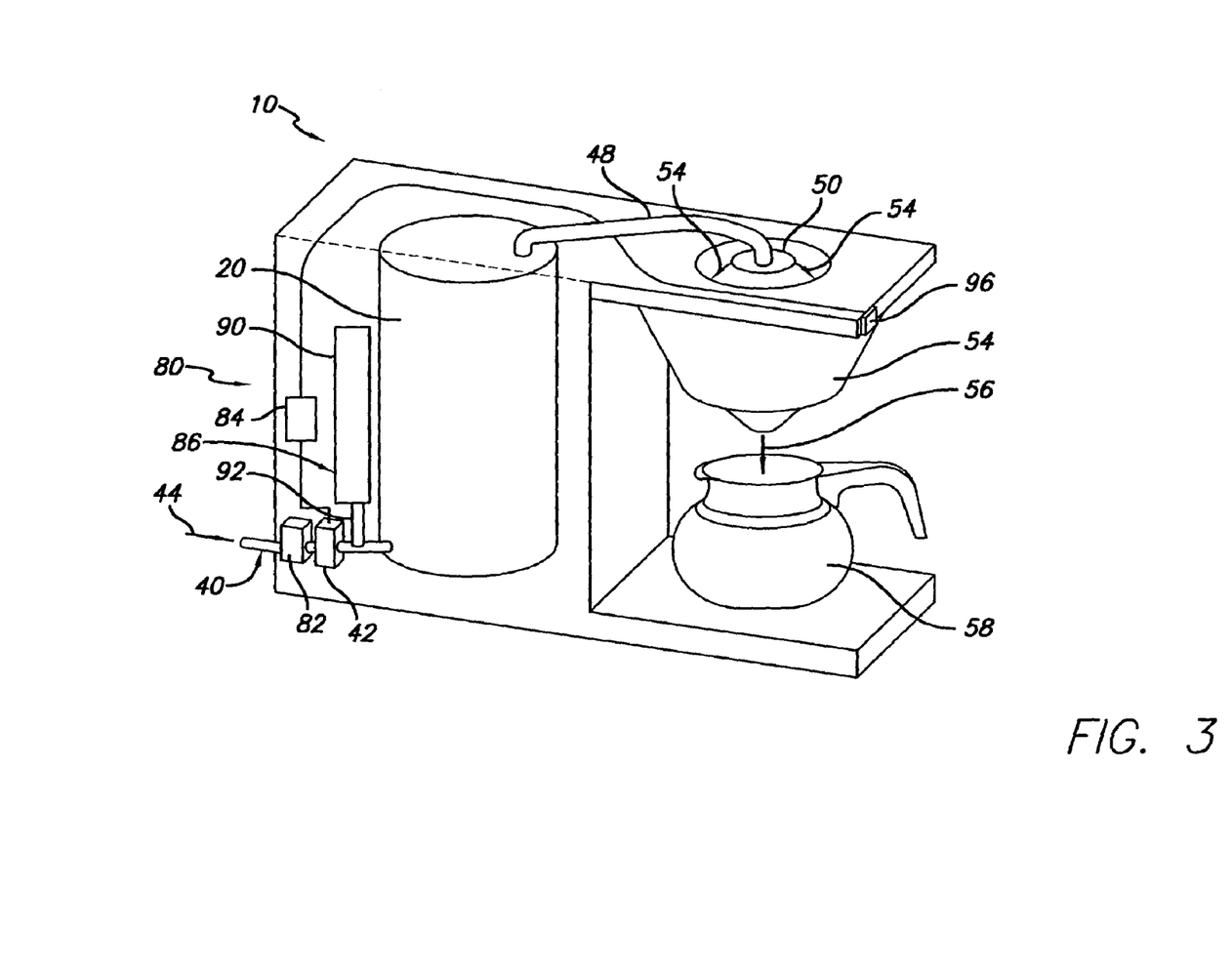
FIG. 3 is a diagrammatic representation of a controllable volume pressurized inlet line system as described in the present disclosure.
Figure 4:
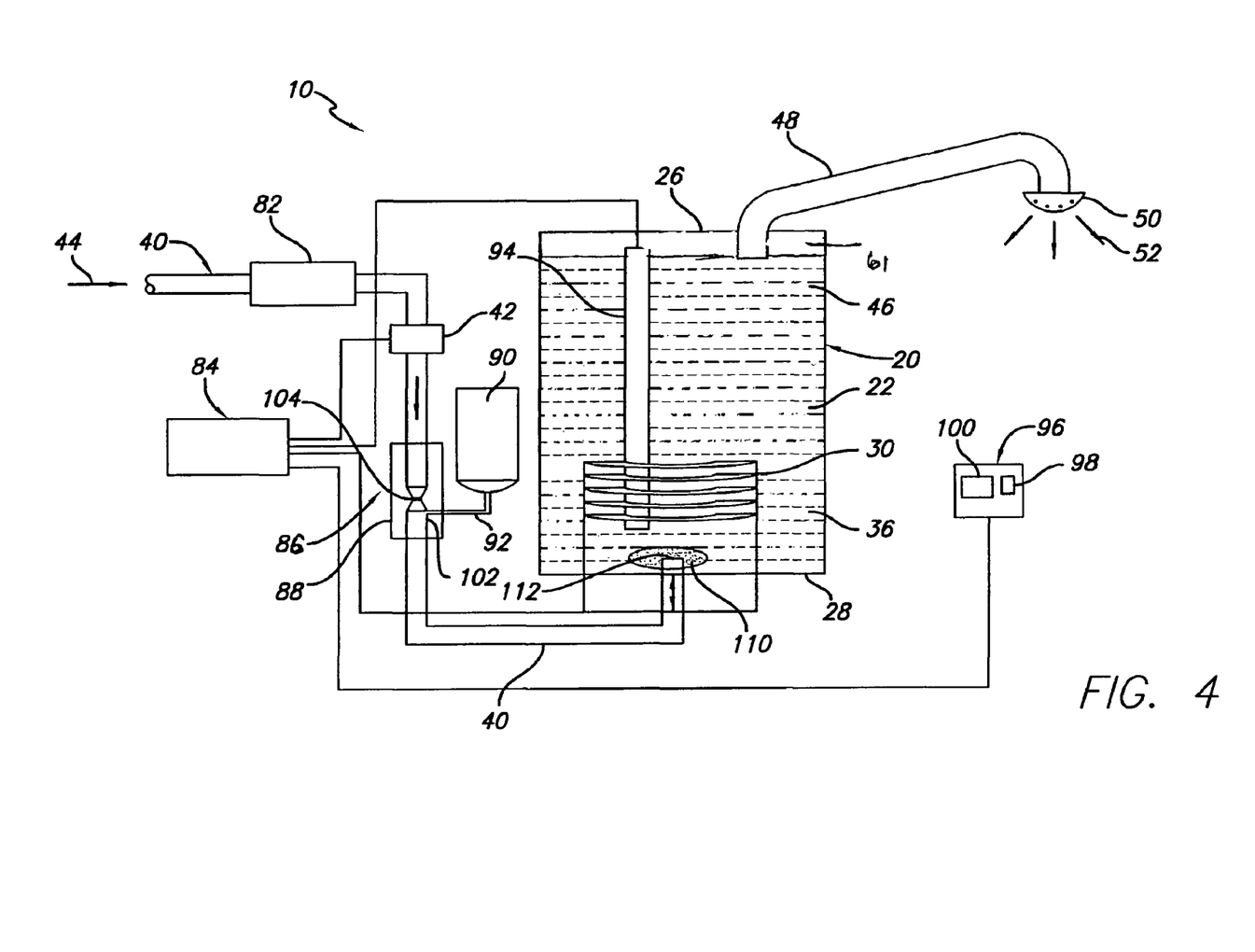
FIG. 4 is a diagrammatic illustration of the brewing system as described here.

Turning now to FIGS. 3 and 4, a brewing system 10 is provided which uses inlet line pressure and includes a reservoir 90 for accommodating expansion of water as it heats within the heated water reservoir 20. As shown in FIG. 3, the diagrammatic representation of a device embodying the general principles of this disclosure is shown. In FIG. 3 the brewer 80 includes a heated water reservoir 20 as described herein. The heated water reservoir 20 receives water through the inlet line 40. Water is dispensed from the heated water reservoir 20 through the outlet line 48 which communicates with the spray head 50 as described herein. The system 10 as disclosed is generally a closed system as shown in FIG. 4 such that water enters the system and exits the system in a flow path which is generally closed to the atmosphere. The only location in which atmosphere may contact the system is at the outlet line 48 where it communicates with the internal volume of the reservoir 20.

As shown, the system receives water through the inlet line 40. Water flows through the inlet line 40 and past a flow regulator 82. The flow regulator 82 communicates with the inlet solenoid valve 42. The flow regulator 82 may be integrated into solenoid 42 or provided as a separate component.

The inlet solenoid valve 42 is coupled to or otherwise communicates with a controller 84. Water continues to flow through the inlet line 40 to the thermal expansion system 86. The thermal expansion system 86 includes a venturi device 88 and an expansion chamber 90. The expansion chamber 90 communicates through passage 92 with the venturi device 88 which in turn communicates with the inlet line 40 positioned between the venturi device 88 and the reservoir 20. Water is introduced into the lower portion 36 of the reservoir 20. The heating element 30 is provided and it is coupled to or otherwise communicates with the controller 84 for controllable heating of the water 22 retained in the reservoir 20. A temperature probe 94 is positioned or is otherwise associated with the reservoir 20 to detect the temperature of water 22 retained in the reservoir. The probe 94 is coupled to or otherwise communicates with the controller 84. The probe 94 may be positioned internal or external to the reservoir 20. It is envisioned that all variations of the heating element 30, temperature probe 94 and other components described herein are fully included within the scope of this disclosure.

A control panel 96 is provided which may include one or more control devices, components, input and/or output devices or switches 98 and may have one or more displays 100. The control panel or control device 96 is coupled to or otherwise communicates with the controller 84. As described above, reference to being coupled to or communicating with the controller 84 envisions all forms of association with the controller 84. In this regard, the lines connecting the devices to the controller 84 define communication paths which may be hard wired, fiber optic, optical, wireless transmissions including RF and other forms of wireless transmissions and any other form of communication path which links these devices to the controller 84 and the controller 84 to the devices where appropriate.

In use, before a brewing cycle is activated, a funnel or other form of beverage brewing device holder 54 is positioned proximate to the spray head 50 to receive water therein. Typically a brewing substance or reconstituting substance as broadly defined herein is provided in association with the funnel or holder 54. Alternatively, the device can produce hot water on command for dispensing into a cup or larger container as appropriate. Regardless of the system in which the device is used, a control device such as a device on the control panel 96 may be used to communicate to the controller 84 to initiate a brewing or dispensing cycle. Upon activation of the control device 96, the controller 84 is instructed to open the control valve 42 to allow water 44 to flow through the inlet line 40. If a flow regulator 82 is used, water flows through the flow regulator 82 to regulate and standardize the flow of water into the system.

As water flows through the inlet line 40 and past the regulator 82 and inlet valve 42 it then is introduced proximate the venturi device 88. The venturi device 88 operates by using the flow action along the path in the device to draw suction on the venturi line 92 communicating with the chamber 90. This venturi effect flow tends to drain or drains some, most or all of the liquid retained in the chamber 90 thereby carrying such liquid through the inlet line 40 to the reservoir 20.

Water is introduced into the lower portion 36 of the reservoir where it is heated upon contact or close association with the heating element 30. Because the reservoir 20 is closed, water introduced into the lower reservoir portion 36 displaces water in the upper portion 46 of the reservoir, moving it up to and through the outlet line 48. As it flows through the outlet line 48 it is allowed to be dispensed through the spray head of known configuration. Outlet line 48 also acts as a vent for the disclosed system to vent the reservoir 20 to atmosphere. In contrast to the systems shown in FIGS. 1 and 2 and described in the Background, this system does not rely on siphon flow through the outlet line 48 (FIG. 1) or by head pressure and a controllable outlet valve (FIG. 2). The present system relies on the inlet pressure of the water 44 flowing through the inlet line 40 as controlled by the controllable inlet valve 42. Accurate timed control of the inlet valve 42 can be used to dispense a predictable controlled quantity of water through the inlet line 40 into the reservoir 20 for displacing a proportionate amount of water 20 from the reservoir. Of course, the water dispensed from the reservoir is generally dispensed from the upper portion 46 which is heated to a desired temperature.

One issue that may be encountered with an inlet line pressurized water control system such as is disclosed is that once a quantity of water is dispensed into the reservoir and displaces a proportionate quantity, the water that has entered the reservoir is typically at a lower temperature because it is generally not heated or is in the process of being heated. As the water is heated in the reservoir 20 by the heating element 30 the volume of the water tends to expand within the reservoir. For example water may expand approximately 6% in volume as it is heated. As such, because the reservoir is generally a closed reservoir the water tends to expand into the volume of least resistance. The outlet line 48 is the volume of least resistance because it essentially communicates with the external atmosphere. As such, the water expanding from the reservoir could flow from through the outlet line 48 and drip out of the spray head 50.

The expansion accommodating system 86, however, is provided to draw or at least receive a volume of water from the reservoir 20 when valve 42 closes. As broadly interpreted, the expansion accommodating system 86 provides a volume or space in which to retain the expansion of water to prevent outflow through the outlet line 48. While one embodiment is illustrated, it is envisioned that other expansion systems could be developed based on the teachings in this description. It is intended that all other embodiments of expansion systems are encompassed within the scope of this application.

The expansion system 86 includes the passage 92 which communicates with the inlet line 40 by way of the venturi device 88. It should be noted that this passage or line 92 communicates with the downstream 102 side of the venturi device 88. As such, the restricted cross sectional area 104 of the venturi device in combination with the controllable solenoid valve 42 results in water being drawn out of the tank 20 and into expansion chamber 90. In other words, the venturi device 88 generally drains the expansion chamber 90 at the beginning of the dispense cycle leaving the chamber 90 in a generally partially or fully evacuated condition, and generally at a lower pressure. At the end of a dispensing cycle the valve 42 is closed ceasing the flow of water through the venturi device 88. When the water flow through the inlet line 40 stops the evacuated chamber 90 tends to draw water from the system through the line 40 and line 92. The chamber 90 tends to be at a lower pressure and as such provides the volume of least resistance into which the expansion water can flow as the water in the reservoir is heated and expands at the end of a brew cycle. As a result, a volume of water is automatically drained from or accommodated by the system at the end of a dispense cycle. By draining or receiving a volume of water from the system the volume of water in the reservoir 20 is reduced. Because the reservoir volume is reduced there is room for water to expand within the reservoir 20 as the newly introduced unheated or cooler water heats and expands. The benefits of the system disclosed herein are that it allows the system to operate under the pressure of the incoming water and accommodates the expansion of water which results in a closed system when newly introduced unheated water is added to the system.

The expansion chamber 90 may be formed of a suitable food grade material such as an appropriate silicone which, for example, may be National Sanitation Foundation certified. One example of such a silicone chamber or bulb is manufactured by Chimed Corporation of Italy. The expansion chamber 90 is also a closed system such that once it expands as a result of inflow from the expanding water from the reservoir 20 it will retain the expansion water subject to draining upon activation of the next brew or dispensing cycle. By drawing a volume of water out of reservoir 20, the expansion chamber 90 prevents dripping or outflowing of water through the outlet line 48. The venturi device 88 is adjusted so as to provide sufficient volume and expansion action to accommodate a volume of water at least equal to the volume of expansion water associated with a full brew cycle volume. By way of example, but not limitation, a brewer may brew a half gallon volume of coffee. To brew a half gallon of coffee the user or the system transfers half of a gallon of water to the reservoir to displace half of a gallon of heated water to the brewing cycle. In this example, as the water added to the system to displace the brew water expands it will effectively require approximately 4 ounces of volume to contain the heated, expanded volume. In this example, if half a gallon of brew is the system maximum volume, the system can be constructed with an expansion system capable of holding approximately at least 4 ounce of expansion water.

The expansion water is retained in the expansion chamber 90 until activation of the next brew or dispensing cycle. Because water flows both ways through the portion of the inlet line 40 between the venturi device 88 and the reservoir 20 a screen or filter 110 may be provided over the mouth 112 of the inlet line 40. The screen or filter structure help to trap and prevent sediment, lime or other minerals or other particles from passing through the inlet line 40 and possibly blocking, clogging or otherwise interfering with the operation of the venturi device 88 and the expansion chamber 90. The inlet flow of water into the reservoir 20 during the activation of the next brewing or dispensing cycle tends to push or flow any debris away from the filter thereby providing a generally continuously clearing or cleaning filter structure.

As water flows from the inlet line 40 through the venturi device 88 the venturi device creates a suction on line 92 thereby withdrawing water from the expansion chamber 90 into the flow path of water entering the reservoir 20. As a result, activation of a brew cycle generally drains the expansion chamber 90 readying it for the end of the next brew cycle whereupon it will accommodate water from the subsequent brew cycle.

The use of the expansion system 86 including the expansion chamber 90 and venturi device 88 provides a passive system to accommodate expansion which does not require controllable components. The positioning of the venturi device 88, control valve 42, expansion system 86 and flow regulator 82 on the cold side of the water system helps to reduce or eliminate the development of minerals, lime or other deposits in the control portion of the water system. In other words, the only structures which are subject to increased lime or mineral accumulation as a result of being on the heated side of the water system, the portion proximate to the heating element 30 and related areas, are the outlet line 48 and the reservoir 20. The spray head 50 can be removed from the outlet line 48 allowing for a cleaning device such as a coil or brush to be inserted through the opening and fed through the outline line 48 all the way to the chamber of the reservoir 20. This helps to easily and efficiently remove deposits in the outlet line 48 thereby promoting periodic cleaning and preventing the detrimental effects of an accumulation of lime or other mineral deposits.

The present system provides for additional benefits. For example, because the outlet line 48 does not rely upon head pressure such as is shown in FIG. 2 or an inlet fill basin 32 as shown in FIG. 1 the only structure extending from the reservoir 20 is the outlet line 48. This being the only structure significantly simplifies the structures associated with the brewer. Line pressure will provide motive force to lift water through line 48 even if sprayhead 50 is above reservoir 20. This allows the outlet line 48 to be positioned in any desired orientation as well as being provided on an adjustable, movable or otherwise positionable structure. For example, a goose-neck structure could be used for the outlet line to allow the outlet line 48 to be positioned over one of multiple funnel-holding structures or for positioning in association with funnel-holding structures having different heights. For example, different height beverage servers might include a funnel structure carried on the top thereof. The different heights can be accommodated by the movable feature of the outlet line 48.

The simplification of the outlet line 48 also reduces the amount of material and components required in the system. For example, there is no need for additional housing structure to house the basin 32 or the basin structure itself (as is needed in the device of FIG. 1). Additionally, there is no need to provide a portion of the reservoir extending up through the housing to provide a head pressure (as is needed in the device of FIG. 2). The simplification of the system also may tend to increase the reliability and possibly reduce costs associated with the system. Further, a lower inlet line pressure may be used to introduce water to the system thereby perhaps accommodating a broader range of locations which can use such a brewing system due to such sites possibly having reduced or inconsistent lower pressure flow. Also, reduced pressure in the system can result in an increase of service life, reliability and a reduction in repair as a result of reduced wear on components including seals and gaskets.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. It is envisioned that those skilled in the art may devise various modifications and equivalents without departing from the spirit and scope of the disclosure as recited in the following combinations. Further, this application is intended to cover such departures from the present disclosure as come within the known or customary practice within the art to which it pertains.

The invention claimed is:
1. A water heating system comprising:
    a water reservoir configured for communication with an inlet water line for receiving water from an inlet water line;

a controllable valve communicating with the inlet line for controlling the flow of water through the line to the reservoir;

a controller coupled to the controllable valve for controllably operating the controllable valve;

a heating device providing energy for heating water retained in the reservoir, the heating device coupled to the controller;

a thermal expansion system communicating with at least one of the reservoir and the inlet line for accommodating the expansion of water in the system when the heating device heats the water in the reservoir, the thermal expansion system being positioned between the controllable valve and the reservoir; and an outlet line communicating with and extending from the reservoir to dispense water from the heated water reservoir.

2. The system of claim 1, wherein the thermal expansion system further comprises a venturi device in communication with the inlet line.

3. The system of claim 2, wherein the thermal expansion system further comprises an expansion chamber which communicates through a passage with the venturi device.

4. The system of claim 1, further comprising a temperature probe associated with the water reservoir, the temperature probe being coupled to and in communication with the controller.

5. The system of claim 1, further comprising an input device coupled to and in communication with the controller.

6. The system of claim 1, wherein the inlet line communicates with and delivers water to a lower portion of the reservoir.

7. The system of claim 1, further comprising a flow regulator for regulating the flow of water in the system, the flow regulator being coupled to the inlet line.

8. The system of claim 1, further comprising a spray head coupled to the outline line to dispense water from the system.

9. The system of claim 8, further comprising a brewing substance retaining device proximate to the spray head for receiving water from the spray head.

10. A beverage brewer having a water heating system comprising:

a water reservoir configured for communication with an inlet water line for receiving water from an inlet water line;

a controllable valve communicating with the inlet line for controlling the flow of water through the line to the reservoir;

a controller coupled to the controllable valve operating the controllable valve;

a heating device providing energy for heating water retained in the reservoir, the heating device coupled to the controller;

a thermal expansion system communicating with at least one of the reservoir and the inlet line for accommodating the expansion of water in the system when the heating device heats the water in the reservoir, the thermal expansion system being positioned between the controllable valve and the reservoir; and an outlet line communicating with and extending from the reservoir to dispense water from the heated water reservoir.

11. The brewer of claim 10, wherein the thermal expansion system further comprises a venturi device in communication with the inlet line.

12. The brewer of claim 11, wherein the thermal expansion system further comprises an expansion chamber which communicates through a passage with the venturi device.

13. The brewer of claim 10, further comprising a temperature probe associated with the water reservoir, the temperature probe being coupled to and in communication with the controller.

14. The brewer of claim 10, further comprising an input device coupled to and in communication with the controller.

15. The brewer of claim 10, wherein the inlet line communicates with and delivers water to a lower portion of the reservoir.

16. The brewer of claim 10, further comprising a flow regulator for regulating the flow of water in the brewer, the flow regulator being coupled to the inlet line.

17. The brewer of claim 10, further comprising a spray head coupled to the outline line to dispense water from the brewer.

18. The brewer of claim 17, further comprising a brewing substance retaining device proximate to the spray head for receiving water from the spray head.

19. An apparatus for heating water, the apparatus comprising:

an input device;

a controller being coupled to the input device;

a water reservoir;

an inlet line for receiving water and carrying water to the water reservoir;

a flow regulator coupled to the inlet line, the flow regulator regulating the flow of water into the water reservoir;

an inlet solenoid valve in communication with the flow regulator, the solenoid valve being controlled by the controller, the inlet solenoid valve controllably allowing water to flow through the inlet line;

a venturi device in communication with the inlet line, the inlet line being positioned between the venturi device and the water reservoir;

an expansion chamber for accommodating the expansion of water in the system, the expansion chamber communicating through a passage with the venturi device, the expansion chamber being positioned between the inlet solenoid valve and the reservoir;

a heating element being in communication with and controlled by the controller, the heating element controllably heating water retained in the reservoir and being coupled to the water reservoir; and an outlet line to dispense water from an upper portion of the heated water reservoir.

20. The system of claim 19, wherein the venturi device is further coupled to a venturi line, the venturi device drawing a suction on the venturi line draining water retained in the expansion chamber.

21. The system of claim 19, further comprising a removable spray head coupled to the outline line to dispense water from the system.

22. The system of claim 20, further comprising a funnel in proximity of the spray head for receiving water from the spray head to be dispensed into a carafe.

23. The system of claim 19, further comprising a temperature probe associated with the water reservoir, the temperature probe being in communication with the controller.

24. The system of claim 19, wherein the water reservoir receives water from a lower portion of the reservoir.

25. A method of heating water including the steps of:

providing a water reservoir;

placing a water inlet line in communication with the reservoir;

placing a controllable valve in communication with the inlet line;

providing a controller coupled to the controllable valve;

controllably operating the controllable valve with the controller for controlling the flow of water through the inlet line to the reservoir;

providing a heating device coupled to and communicating with the controller;

controllably providing heat to water in the reservoir with the heating device for a period of time;

providing a thermal expansion system communicating with at least one of the reservoir and the inlet line for accommodating the expansion of water in the system when the heating device heats the water in the reservoir, the thermal expansion system being positioned between the controllable valve and the reservoir;

receiving water from the reservoir into the expansion system at least during a portion of the time while water in the reservoir is heated.

26. The method of claim 25 further comprising: drawing water out of the thermal expansion system while water is passing through the inlet water line when water is controllable dispensed to the reservoir.

27. The method of claim 25 further comprising dispensing water from the reservoir for use in making a beverage.

28. The method of claim 25, wherein the thermal expansion system further comprises a venturi device in communication with the inlet line.

29. The method of claim 25, further comprising: providing an expansion chamber in the thermal expansion system; and placing the expansion chamber in communication with a venturi device.

30. The method of claim 29, further comprising providing the expansion chamber is formed from a flexible material for receiving and dispensing a volume of water.

* * * * *